(12) United States Patent
Karthik et al.

(10) Patent No.: US 11,416,881 B2
(45) Date of Patent: Aug. 16, 2022

(54) METHOD AND SYSTEM FOR FORECASTING SALES BASED ON N-GRAM MODEL

(71) Applicant: Tata Consultancy Services Limited, Mumbai (IN)

(72) Inventors: Gokul Karthik, Chennai (IN); Avinash Achar, Chennai (IN); Balaraman Ravindran, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 17/216,029

(22) Filed: Mar. 29, 2021

(65) Prior Publication Data

US 2022/0129928 A1 Apr. 28, 2022

(30) Foreign Application Priority Data

Oct. 28, 2020 (IN) .............................. 202021047087

(51) Int. Cl.
*G06Q 30/02* (2012.01)
*G06N 7/00* (2006.01)
*G06Q 10/04* (2012.01)

(52) U.S. Cl.
CPC ......... *G06Q 30/0204* (2013.01); *G06N 7/005* (2013.01); *G06Q 10/04* (2013.01)

(58) Field of Classification Search
CPC ..... G06Q 30/0204; G06Q 10/04; G06N 7/005
See application file for complete search history.

(56) References Cited

U.S. PATENT DOCUMENTS 10,475,056 B2 11/2019 Kahlow
2020/0311559 A1* 10/2020 Chattopadhyay ........ G06N 5/04

OTHER PUBLICATIONS

Demand forecasting for fast-moving products in grocery retail; Moskalev; Mar. 15, 2019 (Year: 2019).*
Large-Scale Cross-Category Analysis of Consumer Review Content on Sales Conversion Leveraging Deep Learning; Liu et al.; Aug. 30, 2019 (Year: 2019).*
Sales forecasting using multivariate long shortterm memory network models; Helmini et al.; May 8, 2019 (Year: 2019).*

(Continued)

*Primary Examiner* — Deirdre D Hatcher
(74) *Attorney, Agent, or Firm* — Finnegan, Henderson, Farabow, Garrett & Dunner, LLP (57) ABSTRACT

This disclosure relates generally to method and system for forecasting sales based on N-Gram model. The present disclosure provides accurate prediction of sales for optimal operations to reduce the cost. The method receives a plurality of inputs of each product comprising a sales history, and a current price bin. The categorical sale(s) for each product is discretized based on the sales history by clustering each product sales history into a one or more groups based on a maximum sales velocity range. Further, a probability table is generated for the discretized categorical sales of each product based on computing a round off weighted mean and a median using a N-Gram model. Then, a smooth probability table is computed for the generated probability table. To forecast sales multistep prediction for the smooth probability table is computed based on at least one of a joint approach, a bootstrapped approach, and a step greedy approach.

15 Claims, 5 Drawing Sheets

(56) References Cited

OTHER PUBLICATIONS

Smyl, Slawek, "A hybrid method of exponential smoothing and recurrent neural networks for time series forecasting", International Journal of Forecasting, Jul. 2019, vol. 36, Research Gate, https://www.researchgate.net/publication/334556784 A hybrid method of exponential smoothing and recurrent neural networks for time series forecasting/link/5d40998992851cd04694ab68/download.

Chaudhari, P. et al., "Discretization of Temporal Data: A Survey", Databases, Feb. 2014, vol. 11, Arxiv, https//arxiv.org/ftp/arxiv/papers/1402/1402.4283.pdf.

\* cited by examiner

METHOD AND SYSTEM FOR FORECASTING SALES BASED ON N-GRAM MODEL

PRIORITY CLAIM

U.S. Patent application claims priority under 35 U.S.C § 119 to Indian patent application no. 202021047087, filed on Oct. 28, 2020. The entire contents of the aforementioned application are incorporated herein by reference.

TECHNICAL FIELD

The disclosure herein generally relates to sales forecasting, and, more particularly, to method and system for forecasting sales based on N-Gram model.

BACKGROUND

In increasingly global economy, there is a need for enterprises to receive sales and other related information from stores and retail entities to update their sales forecasts and plans to adapt changes and/or trends in local and regional sales. Effective management of large business entities or complex projects requires that the decision-makers be provided with accurate and timely information. Typically, sales forecasting is the process of predicting the number of sale units of any product in future timelines given its historical sale records. Many of the sales forecasting approaches utilize factors such as product meta details, seasons, economic trends, competitors pricing to model the future sales. However, accurate predictions enable the enterprises to make informed business decisions and help effective planning of production, stocking and sales. Accurate models, however, have not been available for evaluating multiple promotion plans in terms of sales increase and profitability.

Sales is the target in sales forecasting, which can take any positive integer value limited by the total number of items produced. Although, sale units seem like continuous it does not take floating point values in most of the cases. Majority of the accurate sales forecasting models employ regression methods, the outputs of which are rounded off to produce integer sale unit forecasts. The choice of regression methods over classification methods comes spontaneously because of classification's lack of ordinal knowledge and regression's relative superior performance, unbounded prediction ability, computational efficiency and scalability.

SUMMARY

Embodiments of the present disclosure present technological improvements as solutions to one or more of the above-mentioned technical problems recognized by the inventors in conventional systems. For example, in one embodiment, a system for forecasting sales based on N-Gram model is provided. The system includes a processor, an Input/output (I/O) interface and a memory coupled to the processor is capable of executing programmed instructions stored in the processor in the memory to receive a plurality of inputs of each product comprising a sales history, and a current price bin. Further, a categorical sale for each product is discretized based on the sales history by performing the steps of (i) clustering, each product sales history into a one or more groups based on a maximum sales velocity range, wherein each group has a predefined sales velocity, and (ii) discretizing, each group based on a predefined bin width, wherein each group is categorically predefined. Further, using a N-Gram model a probability table is generated for the discretized categorical sales of each product based on computing a round off weighted mean and a median. Further, a smooth probability table is computed for the generated probability table by applying a hybrid smoothing technique. Furthermore sales forecast is determined for the smooth probability table of multistep prediction based on at least one of (i) a joint approach computed based on the product sales history, a time step, a predicted number of future time steps, (ii) a bootstrapped approach, and (iii) a step greedy approach.

In one embodiment, the smoothing probability table is computed for the probability table by applying the hybrid smoothing technique comprises: (i) determine, a backoff i-Gram probability table by initializing all the values of N-Gram model (ii) determine, a add-k one-Gram probability table by incrementing all the predicted sales value for each product at time and then decrementing the first sale value in condition sequence (iii) compute, weights for the backoff i-Gram probability table and the add-k one-Gram probability table by applying interpolation and (iv) compute, a weighted average for the backoff i-Gram probability table and the add-k one-Gram probability table to obtain the smooth probability table. To forecast the sales using the step greedy approach by, dividing the number of time steps into multiple time step groups with predefined size. Further, utilizing the joint approach for predicting the next time step for a first group using the sales history and then utilizing the bootstrapped approach for predicting the consecutive time step using the previous time step group and the product sales history of the subsequent group.

In another aspect, provides a method for forecasting sales based on N-Gram model that includes a processor, an Input/output (I/O) interface and a memory coupled to the processor is capable of executing programmed instructions stored in the processor in the memory to receive a plurality of inputs of each product comprising a sales history, and a current price bin. Further, a categorical sale for each product is discretized based on the sales history by performing the steps of (i) clustering, each product sales history into a one or more groups based on a maximum sales velocity range, wherein each group has a predefined sales velocity, and (ii) discretizing, each group based on a predefined bin width, wherein each group is categorically predefined. Further, using a N-Gram model a probability table is generated for the discretized categorical sales of each product based on computing a round off weighted mean and a median. Further, a smooth probability table is computed for the generated probability table by applying a hybrid smoothing technique. Furthermore sales forecast is determined for the smooth probability table of multistep prediction based on at least one of (i) a joint approach computed based on the product sales history, a time step, a predicted number of future time steps, (ii) a bootstrapped approach, and (iii) a step greedy approach.

In one embodiment, the smoothing probability table is computed for the probability table by applying the hybrid smoothing technique comprises: (i) determine, a backoff i-Gram probability table by initializing all the values of N-Gram model (ii) determine, a add-k one-Gram probability table by incrementing all the predicted sales value for each product at time and then decrementing the first sale value in condition sequence (iii) compute, weights for the backoff i-Gram probability table and the add-k one-Gram probability table by applying interpolation and (iv) compute, a weighted average for the backoff i-Gram probability table and the add-k one-Gram probability table to obtain the smooth probability table. To forecast the sales using the step greedy approach by, dividing the number of time steps into multiple time step groups with predefined size. Further, utilizing the joint approach for predicting the next time step for a first group using the sales history and then utilizing the bootstrapped approach for predicting the consecutive time step using the previous time step group and the product sales history of the subsequent group.

In yet another aspect, provides one or more non-transitory machine readable information storage mediums comprising one or more instructions, which when executed by one or more hardware processors perform actions includes receive a plurality of inputs of each product comprising a sales history, and a current price bin. Further, a categorical sale for each product is discretized based on the sales history by performing the steps of (i) clustering, each product sales history into a one or more groups based on a maximum sales velocity range, wherein each group has a predefined sales velocity, and (ii) discretizing, each group based on a predefined bin width, wherein each group is categorically predefined. Further, using a N-Gram model a probability table is generated for the discretized categorical sales of each product based on computing a round off weighted mean and a median. Further, a smooth probability table is computed for the generated probability table by applying a hybrid smoothing technique. Furthermore sales forecast is determined for the smooth probability table of multistep prediction based on at least one of (i) a joint approach computed based on the product sales history, a time step, a predicted number of future time steps, (ii) a bootstrapped approach, and (iii) a step greedy approach.

In one embodiment, the smoothing probability table is computed for the probability table by applying the hybrid smoothing technique comprises: (i) determine, a backoff i-Gram probability table by initializing all the values of N-Gram model (ii) determine, a add-k one-Gram probability table by incrementing all the predicted sales value for each product at time and then decrementing the first sale value in condition sequence (iii) compute, weights for the backoff i-Gram probability table and the add-k one-Gram probability table by applying interpolation and (iv) compute, a weighted average for the backoff i-Gram probability table and the add-k one-Gram probability table to obtain the smooth probability table. To forecast the sales using the step greedy approach by, dividing the number of time steps into multiple time step groups with predefined size. Further, utilizing the joint approach for predicting the next time step for a first group using the sales history and then utilizing the bootstrapped approach for predicting the consecutive time step using the previous time step group and the product sales history of the subsequent group.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following embodiments described herein.

Embodiments herein provide a method and system for forecasting sales based on N-Gram model. The system may be alternatively referred as sales forecasting system which enables accurate prediction of sales. Sales forecasting is the process of predicting the number of sale units of any product in future timeline given its historical sale records. The task of statistically predicting target sales are achieved by training the system on features of target data points. Training the system is majorly classified into two types namely, a classification model and a regression model based on the target type. Sales forecasting can take any positive integer value limited by the total number of items produced and limits in taking floating point values. Majority of the accurate sales forecasting methods employ the regression model as the outputs of which are rounded off to produce integer sale unit forecasts. The choice of regression model over the classification model is spontaneous because of the classification model lacking in ordinal knowledge and regressions relative superior performance, unbounded prediction ability, computational efficiency and scalability.

Referring now to the drawings, and more particularly to FIG. 1 through FIG. 4B, where similar reference characters denote corresponding features consistently throughout the figures, there are shown preferred embodiments and these embodiments are described in the context of the following exemplary system and/or method.

Figure 1:
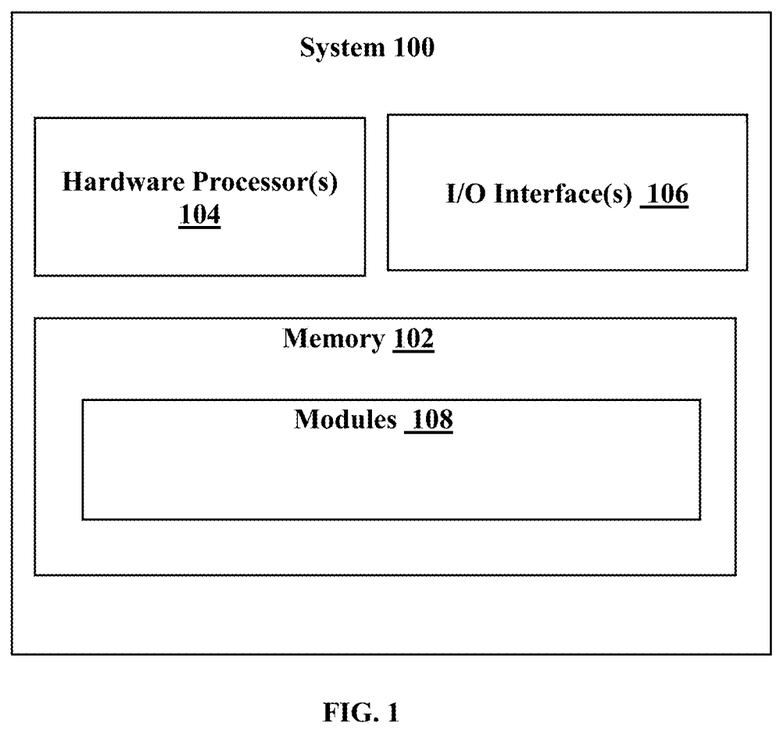
FIG. 1 illustrates an exemplary block diagram of a sales prediction system, in accordance with some embodiments of the present disclosure.

FIG. 1 illustrates an exemplary block diagram of a system (alternatively referred as sales forecasting system), in accordance with some embodiments of the present disclosure. In an embodiment, the sales forecasting system 100 includes processor (s) 104, communication interface (s), alternatively referred as or input/output (I/O) interface(s) 106, and one or more data storage devices or memory 102 operatively coupled to the processor (s) 104. The system 100, with the processor(s) is configured to execute functions of one or more functional blocks of the system 100.

Referring to the components of the system 100, in an embodiment, the processor (s) 104 can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the processor(s) 104 is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 102 may comprise information pertaining to input(s)/output(s) of each step performed by the processor(s) 104 of the system 100 and methods of the present disclosure. Functions of the components of system 100, for inspecting asset using the unmanned aerial vehicle, are explained in conjunction with FIG. 3 through FIG. 4B providing flow diagram, architectural overviews, and performance analysis of the system 100.

Figure 2:
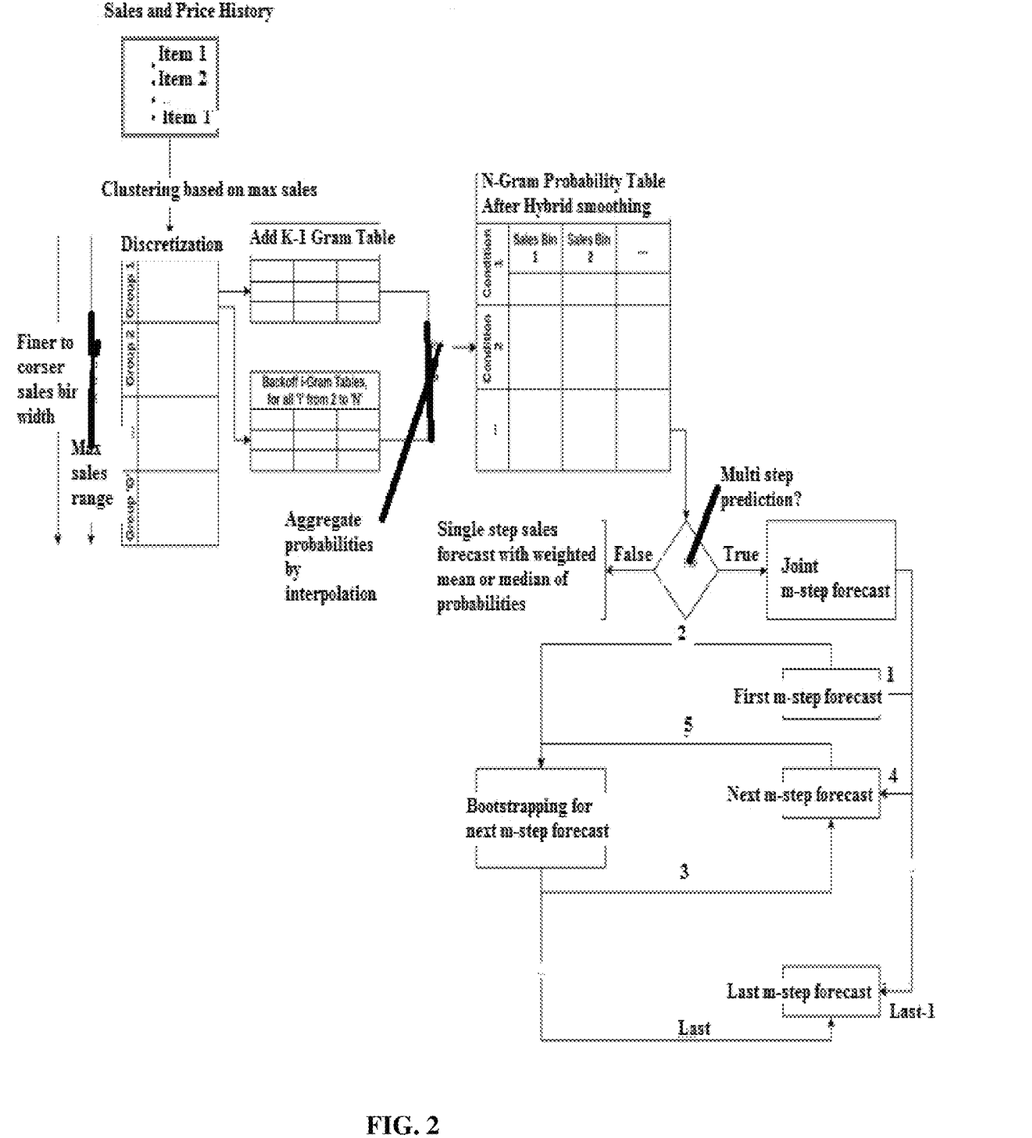
FIG. 2 illustrates a high-level architecture overview of the sales forecasting system, in accordance with some embodiments of the present disclosure.

FIG. 2 illustrates an example high-level architecture overview of the sales forecasting system, in accordance with some embodiments of the present disclosure, in accordance with some embodiments of the present disclosure. FIG. 2 is an example sales forecasting system comprising an N-Gram probability table module, a add k one-Gram table module, a backoff I-Gram table, and a multi-step prediction module. The system 100 accurately predicts sales which enables the companies to make informed business decisions and help effective planning of production, stocking and sales which helps retailers to reduce excess inventory. Most of the modern supply chain management systems rely on demand prediction of items for optimal operations to reduce the cost.

Figure 3:
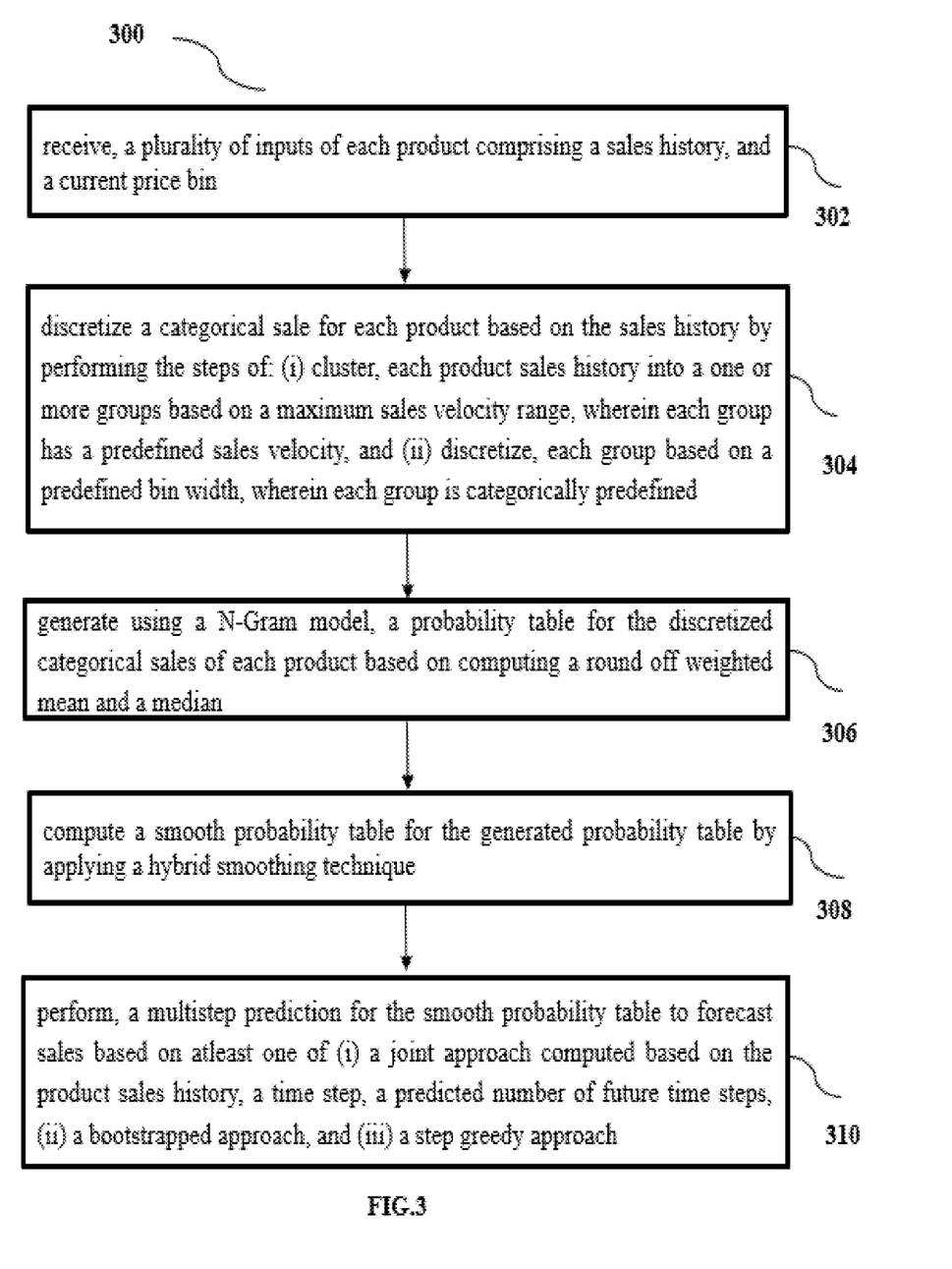
FIG. 3 is a flow diagram illustrating a method for forecasting sales using the system of FIG. 1, in accordance with some embodiments of the present disclosure.

FIG. 3 is a flow diagram illustrating a method for forecasting sales using the system of FIG. 1, in accordance with some embodiments of the present disclosure. In an embodiment, the system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the system 100 as depicted in FIG. 1, the high-level architecture of FIG. 2, and the steps of flow diagram as depicted in FIG. 3. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to the steps of the method 300, at step 302, the one or more hardware processors 104 to receive a plurality of inputs of each product comprising a sales history, and a current price bin. The current price bin is the current price of the product. Referring now to FIG. 2, considering an example, where the system receives inputs corresponding to each product to forecast sales by analyzing various factors such as anomalies in a store, across a cluster or other geographic area, or within a configurable grouping as well as the patterns of anomalies and trends within a pre-defined or configurable period of time (e.g., without limitation, a week). Further, information relevant to forecasting includes a sales information, a product information, a store information and a geographic information is periodically received by the one or more hardware processors 104. This information may be received using any frequency and by any communication means. For instance, the information may be received in near real-time as the sales occur, hourly, daily, weekly or in any other predefined or configurable frequency. Multiple computer applications in communication over a computer network may be utilized to communicate this information. It is to be understood, however, that the information may be received manually or automatically by any means within the scope of the present invention.

Referring now to the steps of the method 300, at step 304, the one or more hardware processors 104 discretize, a categorical sale(s) for each product based on the sales history. For the received product information the method clusters each product sales history into a one or more groups based on a maximum sales velocity range, wherein each group from the one or more groups has a predefined sales velocity keeping the original sales units as classes that leads to sparse representation for the condition-class pairs. Further, each group from the one or more groups is discretized based on a predefined bin width. The one or more groups are clustered based on increase in the width of maximum sales across groups (or clusters) for which the sales bin is made more wider for discretization. These steps are performed iteratively to improve the performance where the sales resolution is made coarser with increase in sales velocity by binning. Also, various use cases related to sales forecasting are not necessarily required for predictions at unit level for higher selling products. Similar products are grouped based on the max historical sales range, and a common model is built for each group. This permits the model to output sales for a product that might be higher than that product(s) observed max sales which is caused by other products in that group. This also has the smoothing effect on the model, reducing the overfitting and leading to better testing performance. 95th percentile of sales for a product can also be used instead of max sales to build a robust model handling the outliers.

Referring now to the steps of the method 300, at step 306, the one or more hardware processors 104 generate, using a N-Gram model, a probability table for the discretized categorical sales of each product based on computing a rounding weighted mean and a median. Now, for the discretized categorical sales of each product sales history the N-Gram model outputs the probability table indexed by the condition and the target classes. The method initially determines a conditional probability distribution for the discretized categorical sales for the product and computes the weighted mean and the median for the categorical sales for the product by leveraging the ordinal structure, wherein the weighted mean is rounded off with nearest value of the mean. Further, it obtains conditional probability distribution for the discretized categorical sales. The probability of all the classes under each condition should sum to the class associated with maximum probability is used as output in a typical classification setting. The ordinal structure of the target (sales here in particular) is leveraged by taking weighted mean with rounding off or taking a median of this probability distribution instead of the simple mode (max probability) to produce outputs. The probability of the categorical sales is provided with specific sales historical condition which is the number of occurrences of combination of historical condition. Further, the specific categorical sales are normalized by total number of occurrences of that historical condition. The probability distribution of sales at time 't' is conditioned by the sales history from {t−N+1} to {t−1} as defined below in equation 1, $$P(S_t \mid S_{t-N+1}^{t-1}) = \frac{C(S_{t-N+1}^{t})}{C(S_{t-N+1}^{t-1})} \quad \text{equation (1)}$$

where,
'P' denotes the conditional probability,
'C' denotes the count function,
'S' denotes the sales,
'N' denotes the N in N-Gram, and subscript to superscript in s denotes the timeframe.

Referring now to the steps of the method 300, at step 308, the one or more hardware processors 104 compute, a smooth probability table for the generated probability table by applying a hybrid smoothing technique to determine the conditional probability distribution having zero entries with probability mass and modifying the probability mass re-entries for non-zero entries. Referring Now to FIG. 2, for the generated probability table the method determines a backoff i-Gram probability table for all the values of N-Gram model and sequentially determines the add-k one-Gram probability table. The add-k one-Gram probability table is incremented for all the predicted sales value for each product at time and then decrementing the first sale value in condition sequence The weight(s) are computed for the backoff i-Gram probability table and the add-k one-Gram probability table by applying interpolation. For the computed weights, a weighted average is determined for the backoff i-Gram probability table and the add-k one-Gram probability table to obtain the smooth probability table. The backoff method/approach assigns non-zero probability mass to the zero-count sale values non-uniformly based on the (N−1)-Gram probability. If the (N−1)-Gram probability itself is zero, it uses (N−2)-Gram. Unlike backoff method/approach, all the lower order N-Gram probabilities are used in interpolation method irrespective of the evidence of the sales sequence. The interpolate probability is computed by weighing the N-Gram, (N−1)-Gram, (N−2)-Gram etc., probabilities and adding them. The weights should always sum to 1. The weights of N-Gram models are randomly initialized and then optimized on the held-out dataset using Expectation-Maximization algorithm.

In one embodiment, overfitting the training data is a common problem in machine learning model that affects testing performance, which is reduced by smoothing the probability table. The hybrid smoothing technique retains the smoothed tables as base tables for further smoothing instead of raw probability tables that can also be used to generate the probability table. Simple method of add-k smoothing will take probability mass from the non-zero-count sale classes and distribute them uniformly across zero-count sale classes. The hybrid method/approach does interpolation on backoff N-Gram probability table rather than raw N-Gram probability tables can be used to arrive at final probability table. Here backoff N-Gram probability tables relies on add-k smoothing for discounting as depicted below in equation 2, $$P_{hybrid}(S_t \mid S_{t-N+1}^{t-1}) = \lambda_N P_{BO}(S_t \mid S_{t-N+1}^{t-1}) + \quad \text{equation (2)}$$
$$\lambda_{N-1} P_{BO}(S_t \mid S_{t-N+2}^{t-1}) + \ldots \lambda_2 P_{BO}(S_t \mid S_{t-1}) + \lambda_1 P_{add-k}(S_t)$$

Where,
'P' denotes the conditional probability,
'BO' denotes back-off,
's' denotes the sales,
'N' denotes the N in N-Gram, and subscript to superscript in s denotes the timeframe, and 'lambda' denotes the weight computed using interpolation.

In one embodiment, scaling of N-Gram Model by computing the probability table exponentially with 'N' and the number of sales classes. The utilization of RNN Classifier to approximate the N-Gram probability table in case of such an explosion. The model is compiled by stacking the output layer over the RNN layer. The RNN layer takes numeric sales at time T as input to output hidden state values. The hidden state values are further passed through the output layer, with the number of nodes equal to the sales classes, to predict sales class at time 't+1'. Softmax operation should be performed on the values returned by output layer to ensure the probability distribution. The same 'sales' feature is considered as numerical in the input (instead of categorical as in the N-Gram case) and categorical in the output. For the model training, defining the data sampler that draws mini batches of sales N-Gram uniformly from a set of sale sequences. These mini batches of data are forwarded through the model. Then the loss is computed by aggregating the cross-entropy loss between actual sale class and the predicted sale class probabilities at each time step. Finally, the model is trained for the certain the number of epochs to minimize this loss. To approximate the N-Gram probability table passing all the possible conditions of sales sequences through the trained model. In each pass, the model will output the conditional probabilities at all the time steps. The final timestep probability distribution at each pass is used to fill the corresponding row of the N-Gram table. This method can also be extended to include exogenous features like 'price' in probability conditioning.

Referring now to the steps of the method 300, at step 310, the one or more hardware processors 104 perform a multi-step prediction for the smooth probability table to forecast sales based on at least one of (i) a joint approach computed based on the product sales history, a time step, a predicted number of future time steps, (ii) a bootstrapped approach, and (iii) a step greedy approach. Referring now to FIG. 2 as depicted above the example the N-Gram probability table is processed to obtain single step output for the given sales history along with exogenous factors. However, the multi-step sales forecasting is often essential to make informed business decisions in the medium to long term setting, which is incorporated by any of the following approaches such as (i) a joint approach, (ii) a bootstrapped approach, and (iii) a step greedy approach. In the Bootstrap approach, the single step prediction is done iteratively for the required number of future steps by varying the condition of the next step by appending the prediction at the current step. For the given sales history of each product, the bootstrap approach predicts the next time step (t+1) using the sales history and then further predicts the next time step (t+2) using the predicted previous time step (t+1) and the sales history. In the Joint approach, the sales sequence for the required number of future time steps is estimated using the maximum joint probability, approximated using the Beam Search technique which is widely used in the Neural Machine Translation task. The length of the conditioning sequence in the right-hand side keeps on increasing while iterating. Hence, we need higher order [N to N+M]-Gram tables to complete this prediction. This will exponentially increase the computing time by using the approximate equation that require only the N-Gram table.

In the step greedy approach which is a multi-step extension can also be facilitated by choosing somewhere between these two approaches. In such case, the future timesteps are partitioned into groups. The joint approach is executed for each group and the bootstrap approach is used for transition between groups which performs the steps by dividing M into multiple time step groups each of size m. The system and method then utilize the joint approach for predicting the next time step (t+1) m time step for the first group using the sales history. Then bootstrapped approach is utilized for predicting the next time step (t+2) using the predicted previous time step group m and the sales history for the subsequent group.

Figure 4A:
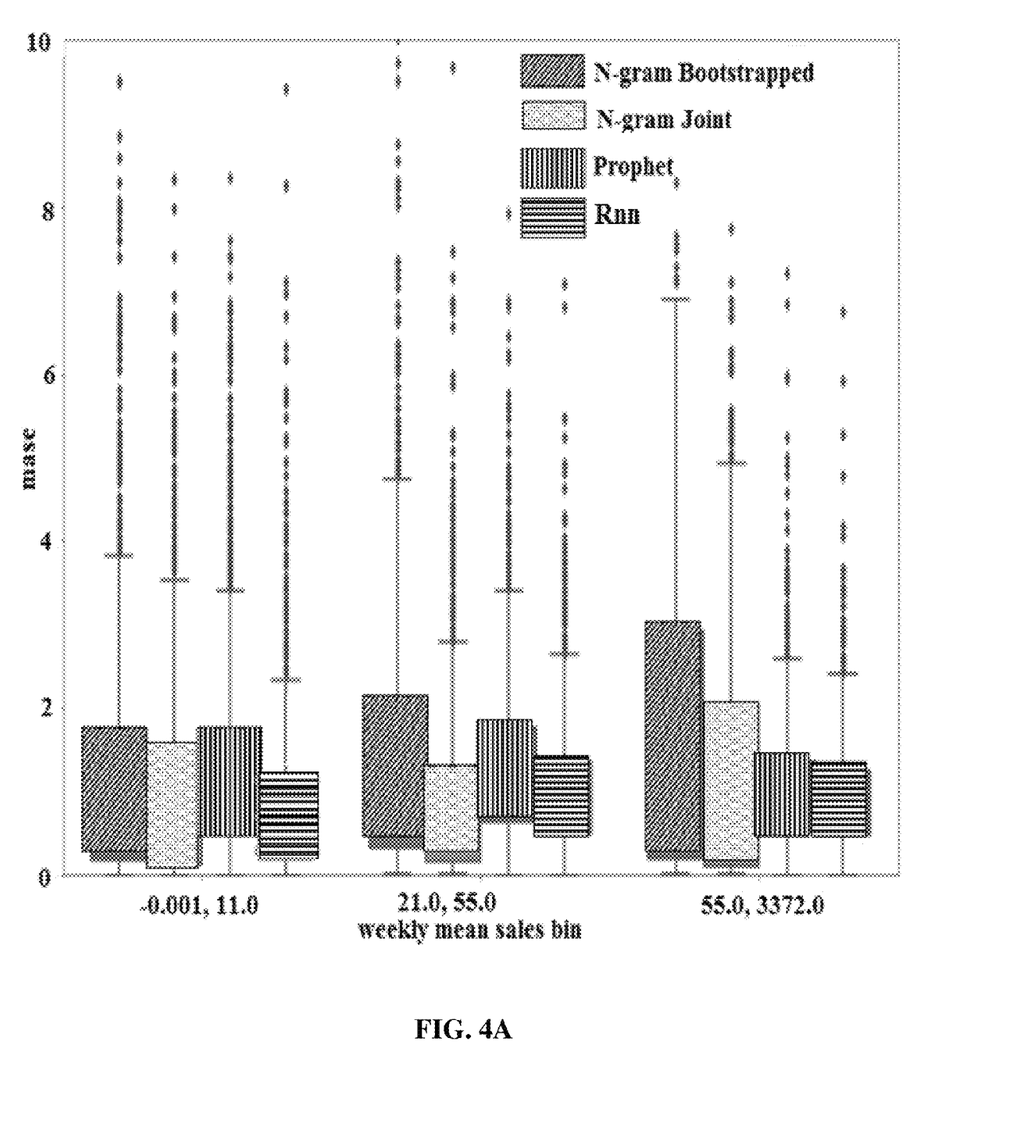
FIGS. 4A and 4B illustrates a performance analysis of N-Gram model with joint multi step prediction using the system of FIG. 1, in accordance with some embodiments of the present disclosure.
Figure 4B:
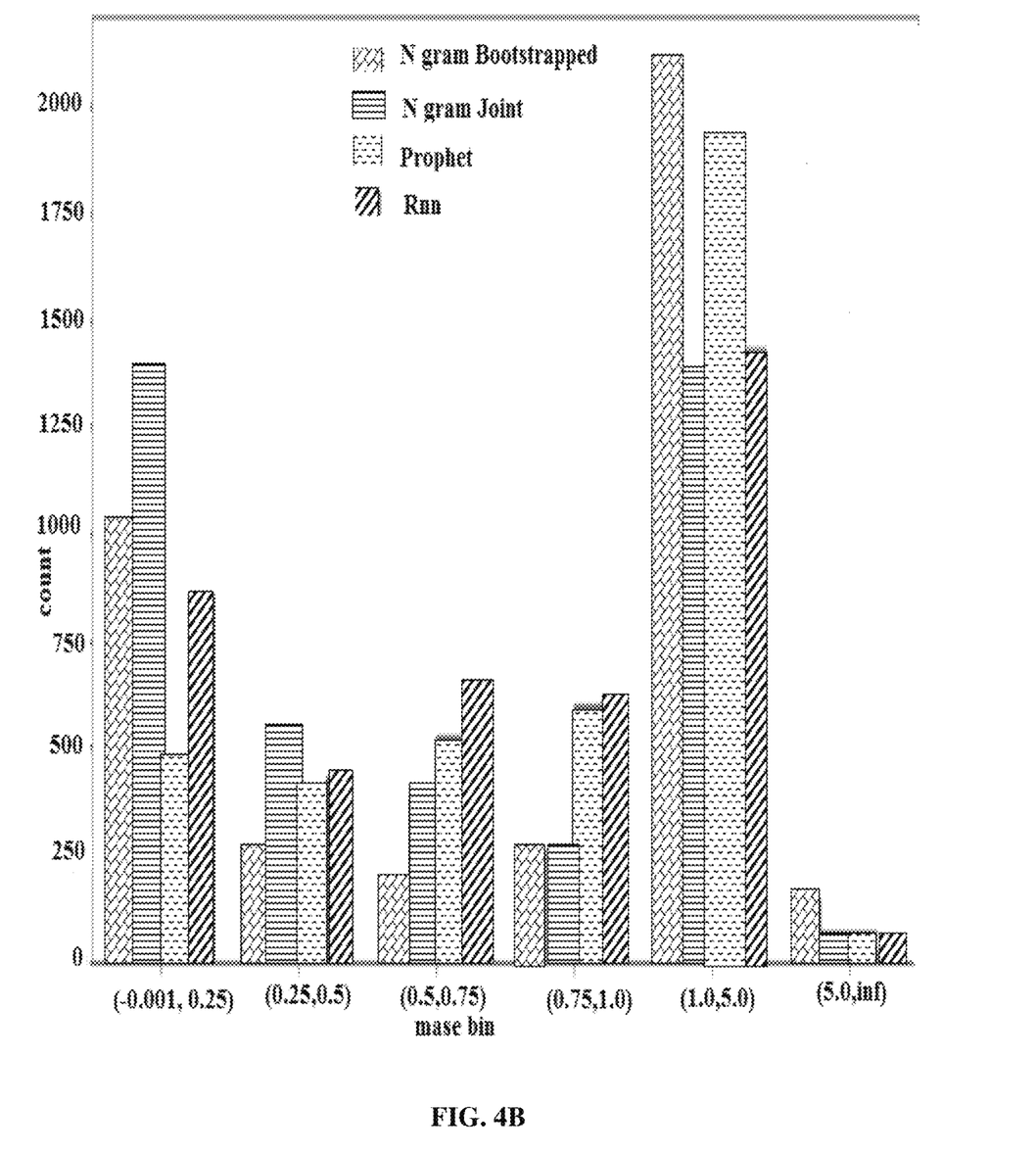

FIGS. 4A and 4B illustrates a performance analysis of N-Gram model with joint multi step prediction using the system of FIG. 1, in accordance with some embodiments of the present disclosure. The system was analyzed by performing the N-Gram based model for the sales prediction task. The dataset consists of weekly aggregated sales and weekly aggregated price information of different SKUs (Stock Keeping Units Retails jargon for items) over the period of 104 weeks. The task is formulated to predict the weekly sales from week 93 to week 104 using the historical sales and price information. The SKUs are segmented into different groups based on the maximum weekly sales and N-Gram model is trained. Prediction is done with two variants of the prediction method namely the bootstrapped approach and the Joint approach. The SKUs are segmented into different groups based on the maximum weekly sales and N-Gram model is trained and evaluated. The results are then combined. Mean Absolute Scaled Error (MASE) has been used as the evaluation metric as denoted below in equation 3, $$MASE = \frac{1}{T}\sum_{t=1}^{T}\frac{MAE[t]}{MAE[t]\text{ of copy previous model} + 10e^{-7}} \quad \text{equation (3)}$$

Where MAE[t] is the Mean Absolute Error for the T-th step prediction. The MASE values of different models over 3999 SKUs is summarized in the below Table 1.

TABLE 1

| Mean Absolute Error Model | | | | |
|---|---|---|---|---|
| | NGB | NGJ | Prophet | RNN |
| Count | 3999.000000 | 3999.000000 | 3999.000000 | 3999.000000 |
| Mean | 1.574163 | 1.030890 | 1.287171 | 0.943691 |

TABLE 1-continued

| Mean Absolute Error Model | | | | |
|---|---|---|---|---|
| | NGB | NGJ | Prophet | RNN |
| Std | 1.620287 | 1.243648 | 1.166287 | 0.901799 |
| Min | 0.000000 | 0.000000 | 0.000000 | 0.000000 |
| 25% | 0.231310 | 0.135173 | 0.555593 | 0.334368 |
| 50% | 1.258874 | 0.563161 | 1.003209 | 0.773832 |
| 75% | 2.311417 | 1.504578 | 1.661642 | 1.233124 |
| Max | 16.016217 | 9.674122 | 13.298596 | 12.971995 |

Referring now to FIG. 4B, the distribution of SKUs across increasing order of MASE bins is visualized below. Where, NGB refers to N-Gram model with bootstrapped predictions. 'NGJ' refers to N-Gram model with joint predictions. Referring now to FIG. 4A, the box plots of MASE for SKUs across different weekly average sales bin are visualised below in Table 2. The median MASE ($50^{th}$ percentile) of N-Gram model with joint multi-step prediction is lesser than other models.

TABLE 2

| N-Gram model with joint multi-step prediction | | | | |
|---|---|---|---|---|
| Model Best Model SKU Group | NGB | NGJ | Prophet | RNN |
| NGB alone | 0.959596 | 1.819256 | 1.583492 | 1.564826 |
| NGJ alone | 2.102570 | .448603 | 1.443853 | 1.090733 |
| Prophet alone | 2.093686 | 1.816569 | 0.678946 | 1.119613 |
| RNN alone | 1.929389 | 1.536064 | 1.405972 | 0.686254 |
| NGB, NGJ | 0.259483 | 0.259483 | 1.403270 | 0.881515 |
| NGB, NGJ, prophet | 0.000000 | 0.000000 | 0.000000 | 0.000000 |

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the present disclosure or if they include equivalent elements with insubstantial differences from the literal language of the embodiments described herein.

The embodiments of present disclosure herein address unresolved problem of forecasting sales with accurate prediction. The embodiments thus provide a method and system for forecasting sales based on N-Gram model. Moreover, the embodiments herein further provide forecasting the number of sale units of any product in future timeline based on historical data. The present disclosure utilizes ordinal knowledge of the target (sales bin) in the classification model. The present disclosure is scalable providing wide range of target by binning and computationally efficient multi step forecasting method using step greedy approach. The task of statistically predicting target sales from the features is achieved by training the system on features of target data points.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated herein.

What is claimed is:

1. A processor implemented method (300) for forecasting sales based on N-Gram model, the method comprising the steps of:
   receiving (302), via a one or more hardware processors, a plurality of inputs of each product comprising a sales history, and a current price bin and receive a sales information, a product information, a store information and a geographic information periodically in near real-time as the sales occur, hourly, daily, weekly through multiple computer applications in communication over a computer network;
   discretizing (304), via the one or more hardware processors, a categorical sale for each product based on the sales history by performing the steps of:
   (a) cluster, each product sales history into a one or more groups based on a maximum sales velocity range, wherein each group has a predefined sales velocity, and
   (b) discretize, each group based on a predefined bin width, wherein each group is categorically predefined;
   generating (306), via the one or more hardware processors, using a N-Gram model, a probability table for the discretized categorical sales of each product based on computing a round off weighted mean and a median, wherein the N-Gram model is compiled by stacking an output layer over a recurrent neural network (RNN) layer, wherein the RNN layer takes numeric sales at time 't' as input to output hidden state values and the hidden state values are further passed through the output layer, with number of nodes equal to sales classes, to predict sales class at time 't+1';
   computing (308), via the one or more hardware processors, a smooth probability table for the generated probability table by applying a hybrid smoothing technique; and
   performing (310), via the one or more hardware processors, a multistep prediction for the smooth probability table to forecast sales based on at least one of (i) a joint approach computed based on the product sales history, a time step, a predicted number of future time steps, (ii) a bootstrapped approach, and (iii) a step greedy approach, wherein the step greedy approach is computationally efficient multi-step forecasting method.

2. The method as claimed in claim 1, wherein computing the round off weighted mean and median for the categorical sales corresponding to each product by leveraging the ordinal structure of the probability table, wherein the weighted mean is rounded off with nearest value of the mean.

3. The method as claimed in claim 1, determining a conditional probability distribution discretized for the categorical sales product having zero entries with probability mass and modifying the probability mass re-entries for non-zero entries.

4. The method as claimed in claim 1, wherein computing the smoothing probability table for the probability table by applying the hybrid smoothing technique comprises:
   determine, a backoff i-Gram probability table by initializing all the values of N-Gram model;
   determine, a add-k one-Gram probability table by incrementing all the predicted sales value for each product at time and then decrementing the first sale value in condition sequence;

compute, weights for the backoff i-Gram probability table and the add-k one-Gram probability table by applying interpolation; and compute, a weighted average for the backoff i-Gram probability table and the add-k one-Gram probability table to obtain the smooth probability table.

5. The method as claimed in claim 1, wherein forecasting the sales using the joint approach is based on retrieving multi step sales sequence with the maximum probability and the length of product sales sequence.

6. The method as claimed in claim 1, wherein forecasting the sales using the step greedy approach comprises:

divide, the number of time steps into multiple time step groups with predefined size;

predict, based on the joint approach for the next time step of a first group using the sales history; and predict, based on the bootstrapped approach the consecutive time step using the previous time step group and the product sales history of the subsequent group.

7. The method as claimed in claim 1, wherein forecasting the sales using the bootstrapped approach comprises predicting iteratively consecutive time step for each product based on a previous time step (t+1) by varying the condition of the next step by appending the prediction at the current step and the product sales history.

8. A system (100) for forecasting sales based on N-Gram model, the system (100) comprising:

a memory (102) storing instructions;

one or more Input/Output (I/O) interfaces (106); and one or more hardware processors (104) coupled to the memory (102) via the one or more I/O interfaces (106), wherein the one or more hardware processors (104) are configured by the instructions to:

receive, a plurality of inputs of each product comprising a sales history, and a current price bin and receive a sales information, a product information, a store information and a geographic information periodically in near real-time as the sales occur, hourly, daily, weekly through multiple computer applications in communication over a computer network;

discretize, a categorical sale for each product based on the sales history by performing the steps of:
 (a) cluster, each product sales history into a one or more groups based on a maximum sales velocity range, wherein each group has a predefined sales velocity, and
 (b) discretize, each group based on a predefined bin width, wherein each group is categorically predefined;

generate, using a N-Gram model, a probability table for the discretized categorical sales of each product based on computing a round off weighted mean and a median, wherein the N-Gram model is compiled by stacking an output layer over a recurrent neural network (RNN) layer, wherein the RNN layer takes numeric sales at time 't' as input to output hidden state values and the hidden state values are further passed through the output layer, with number of nodes equal to sales classes, to predict sales class at time 't+1';

compute, a smooth probability table for the generated probability table by applying a hybrid smoothing technique; and perform, a multistep prediction for the smooth probability table to forecast sales based on at least one of (i) a joint approach computed based on the product sales history, a time step, a predicted number of future time steps, (ii) a bootstrapped approach, and (iii) a step greedy approach, wherein the step greedy approach is computationally efficient multi-step forecasting method.

9. The system (100) as claimed in claim 8, wherein computing the round off weighted mean and median for the categorical sales corresponding to each product by leveraging the ordinal structure of the probability table, wherein the weighted mean is rounded off with nearest value of the mean.

10. The system (100) as claimed in claim 8, determining a conditional probability distribution discretized for the categorical sales product having zero entries with probability mass and modifying the probability mass re-entries for non-zero entries.

11. The system (100) as claimed in claim 8, wherein computing the smoothing probability table for the probability table by applying the hybrid smoothing technique comprises:

determine, a backoff i-Gram probability table by initializing all the values of N-Gram model;

determine, a add-k one-Gram probability table by incrementing all the predicted sales value for each product at time and then decrementing the first sale value in condition sequence;

compute, weights for the backoff i-Gram probability table and the add-k one-Gram probability table by applying interpolation; and compute, a weighted average for the backoff i-Gram probability table and the add-k one-Gram probability table to obtain the smooth probability table.

12. The system (100) as claimed in claim 8, wherein forecasting the sales using the joint approach is based on retrieving multi step sales sequence with the maximum probability and the length of product sales sequence.

13. The system (100) as claimed in claim 8, wherein forecasting the sales using the step greedy approach comprises:

divide, the number of time steps into multiple time step groups with predefined size;

predict, based on the joint approach for the next time step of a first group using the sales history; and predict, based on the bootstrapped approach the consecutive time step using the previous time step group and the product sales history of the subsequent group.

14. The system (100) as claimed in claim 8, wherein forecasting the sales using the bootstrapped approach comprises predicting iteratively consecutive time step for each product based on a previous time step (t+1) by varying the condition of the next step by appending the prediction at the current step and the product sales history.

15. One or more non-transitory machine-readable information storage mediums comprising one or more instructions which when executed by one or more hardware processors perform actions comprising:

receiving, a plurality of inputs of each product comprising a sales history, and a current price bin and receive a sales information, a product information, a store information and a geographic information periodically in near real-time as the sales occur, hourly, daily, weekly through multiple computer applications in communication over a computer network;

discretizing, a categorical sale for each product based on the sales history by performing the steps of:
 (a) cluster, each product sales history into a one or more groups based on a maximum sales velocity range, wherein each group has a predefined sales velocity, and (b) discretize, each group based on a predefined bin width, wherein each group is categorically predefined;

generating, using a N-Gram model, a probability table for the discretized categorical sales of each product based on computing a round off weighted mean and a median, wherein the N-Gram model is compiled by stacking an output layer over a recurrent neural network (RNN) layer, wherein the RNN layer takes numeric sales at time 't' as input to output hidden state values and the hidden state values are further passed through the output layer, with number of nodes equal to sales classes, to predict sales class at time 't+1';

computing, a smooth probability table for the generated probability table by applying a hybrid smoothing technique; and performing, a multistep prediction for the smooth probability table to forecast sales based on at least one of (i) a joint approach computed based on the product sales history, a time step, a predicted number of future time steps, (ii) a bootstrapped approach, and (iii) a step greedy approach, wherein the step greedy approach is computationally efficient multi-step forecasting method.

\* \* \* \* \*